(12) United States Patent
Luo et al.

(10) Patent No.: US 7,857,906 B2
(45) Date of Patent: Dec. 28, 2010

(54) FIBER REINFORCED CEMENT COMPOSITE MATERIALS USING CHEMICALLY TREATED FIBERS WITH IMPROVED DISPERSIBILITY

(75) Inventors: Caidian Luo, Alta Loma, CA (US); Donald J. Merkley, Alta Loma, CA (US)

(73) Assignee: James Hardie Technology Limited, Dublin (IE)

( * ) Notice: Subject to any disclaimer, the term of this patent is extended or adjusted under 35 U.S.C. 154(b) by 0 days.

(21) Appl. No.: 12/070,838

(22) Filed: Feb. 21, 2008

(65) Prior Publication Data

US 2008/0148999 A1 Jun. 26, 2008

Related U.S. Application Data

(60) Division of application No. 10/090,060, filed on Mar. 1, 2002, now Pat. No. 7,344,593, which is a continuation of application No. 09/969,742, filed on Oct. 2, 2001, now Pat. No. 6,676,745.

(60) Provisional application No. 60/274,414, filed on Mar. 9, 2001.

(51) Int. Cl.
*C04B 16/02* (2006.01)

(52) U.S. Cl. .................... 106/730; 106/644

(58) Field of Classification Search .............. 106/644, 106/730

See application file for complete search history.

(56) References Cited

U.S. PATENT DOCUMENTS

| 1,571,048 | A | 1/1926 | Garrow |
| 1,914,163 | A | 6/1933 | Randall |
| 2,024,689 | A | 12/1935 | Walter et al. |
| 2,030,383 | A | 2/1936 | Luth et al. |
| 2,054,854 | A | 9/1936 | Dreyfus |
| 2,156,308 | A | 5/1939 | Schuh |
| 2,156,311 | A | 5/1939 | Schuh |
| 2,175,568 | A | 10/1939 | Haustein |

(Continued)

FOREIGN PATENT DOCUMENTS

AR 250022 10/1991

(Continued)

OTHER PUBLICATIONS

Zhou, Ming, The Trial of Antisepsis and Mothproff on Rural Timber Structure Architectures, China Wood Industry, Issue 2 of 1987, pp. 16-24.

(Continued)

*Primary Examiner*—Paul Marcantoni
(74) *Attorney, Agent, or Firm*—Gardere Wynne Sewell LLP

(57) ABSTRACT

A fiber-reinforced building material in one embodiment incorporates cellulose fibers that are chemically treated with a dispersant to impart improved dispersibility to the fibers. The fibers are treated with a dispersant which deactivates the hydroxyl sites of the fiber surfaces and in some cases, making the fiber surface more hydrophobic. The dispersant inhibits the hydroxyl groups on the cellulose fiber surface from bonding with hydroxyl groups of other fibers and from bonding with hydroxyl groups of the same fiber, thereby significantly reducing inter-fiber and intra-fiber hydrogen bonding. The treated fibers can be readily dispersed and uniformly distributed throughout a mixture without re-clustering or reclumping once the mechanical mixing action stops. The chemically treated fibers with improved dispersibility improve the fiber distribution and reinforcing efficiency, which in turn improves key physical and mechanical properties of the material such as the modulus of rupture, z-direction tensile strength, and toughness, and surface finishes. With improved fiber reinforcing efficiency, less dosage of fiber is needed to achieve the required physical and mechanical properties.

21 Claims, 4 Drawing Sheets

FIBER DISPERSANT TREATMENT IN SOLUTION

U.S. PATENT DOCUMENTS

| | | | |
|---|---|---|---|
| 2,175,569 A | 10/1939 | Kennedy | |
| 2,176,668 A | 10/1939 | Egeberg et al. | |
| 2,377,484 A | 6/1945 | Elmendorf | |
| 2,645,576 A | 7/1953 | Bate et al. | |
| 2,880,101 A | 3/1959 | Torsten Ulfstedt | |
| 3,264,125 A | 8/1966 | Bourlin | |
| 3,716,386 A * | 2/1973 | Kempster | 106/644 |
| 3,748,100 A | 7/1973 | Forseth | |
| 3,748,160 A | 7/1973 | Carbajal | |
| 3,753,749 A | 8/1973 | Nutt | |
| 3,836,412 A | 9/1974 | Boustany et al. | |
| 3,843,380 A | 10/1974 | Beyn | |
| 3,865,779 A | 2/1975 | Oya et al. | |
| 3,918,981 A | 11/1975 | Long | |
| 3,931,069 A | 1/1976 | Lundin | |
| 3,969,567 A | 7/1976 | Occleshaw et al. | |
| 3,998,944 A | 12/1976 | Long | |
| 4,003,752 A | 1/1977 | Isohata et al. | |
| 4,013,480 A | 3/1977 | Chumbley et al. | |
| 4,088,804 A | 5/1978 | Cornwell et al. | |
| 4,098,701 A | 7/1978 | Burrill et al. | |
| 4,102,697 A | 7/1978 | Fukuba et al. | |
| 4,138,313 A | 2/1979 | Hillstrom et al. | |
| 4,177,176 A | 12/1979 | Burrill et al. | |
| 4,225,383 A | 9/1980 | McReynolds | |
| 4,258,090 A | 3/1981 | Moraru | |
| 4,274,913 A | 6/1981 | Kikuiri et al. | |
| 4,306,911 A * | 12/1981 | Gordon et al. | 106/644 |
| 4,351,867 A | 9/1982 | Mulvey et al. | |
| 4,406,703 A * | 9/1983 | Guthrie et al. | 106/731 |
| 4,428,775 A | 1/1984 | Johnson et al. | |
| 4,457,785 A | 7/1984 | Hsu et al. | |
| 4,486,234 A | 12/1984 | Herr | |
| 4,497,688 A | 2/1985 | Schaefer | |
| 4,510,020 A | 4/1985 | Green et al. | |
| 4,517,375 A | 5/1985 | Schmidt et al. | |
| 4,548,676 A | 10/1985 | Johnstone et al. | |
| 4,637,860 A | 1/1987 | Harper et al. | |
| 4,643,920 A | 2/1987 | McEntee et al. | |
| 4,647,505 A | 3/1987 | Blackie et al. | |
| 4,647,509 A | 3/1987 | Wallace et al. | |
| 4,647,589 A | 3/1987 | Valone | |
| 4,655,979 A | 4/1987 | Nakano et al. | |
| 4,659,386 A | 4/1987 | Nagai et al. | |
| 4,738,723 A | 4/1988 | Frizzell et al. | |
| 4,766,113 A | 8/1988 | West et al. | |
| 4,806,203 A | 2/1989 | Elton | |
| 4,938,958 A | 7/1990 | Niira et al. | |
| 4,944,842 A | 7/1990 | Stromberg et al. | |
| 4,971,658 A | 11/1990 | Henrickson et al. | |
| 4,985,119 A | 1/1991 | Vinson et al. | |
| 5,021,093 A | 6/1991 | Beshay | |
| 5,030,289 A | 7/1991 | Sattler et al. | |
| 5,047,086 A | 9/1991 | Hayakawa et al. | |
| 5,049,196 A | 9/1991 | Ries | |
| 5,063,260 A | 11/1991 | Chen et al. | |
| 5,102,596 A | 4/1992 | Lempfer et al. | |
| 5,118,225 A | 6/1992 | Koch et al. | |
| 5,191,456 A | 3/1993 | Sutherland et al. | |
| 5,223,090 A | 6/1993 | Klungness et al. | |
| 5,236,994 A | 8/1993 | Markusch et al. | |
| 5,346,541 A | 9/1994 | Goldman et al. | |
| 5,403,392 A | 4/1995 | Craig | |
| 5,405,498 A | 4/1995 | Pease | |
| 5,415,734 A | 5/1995 | Backlund et al. | |
| 5,421,867 A | 6/1995 | Yeager et al. | |
| 5,429,717 A | 7/1995 | Bokstrom et al. | |
| 5,432,215 A | 7/1995 | Girg et al. | |
| 5,465,547 A | 11/1995 | Jakel | |
| 5,472,486 A | 12/1995 | Dragner et al. | |
| 5,482,550 A | 1/1996 | Strait | |
| 5,520,779 A | 5/1996 | Bold et al. | |
| 5,577,024 A | 11/1996 | Malkamaki et al. | |
| RE35,460 E | 2/1997 | Klungness et al. | |
| 5,643,359 A | 7/1997 | Soroushian et al. | |
| 5,705,542 A | 1/1998 | Roffael et al. | |
| 5,777,024 A | 7/1998 | Killilea et al. | |
| 5,786,282 A | 7/1998 | Carter et al. | |
| 5,795,515 A | 8/1998 | Fischer et al. | |
| 5,804,003 A | 9/1998 | Nishizawa et al. | |
| 5,866,057 A | 2/1999 | Roffael et al. | |
| 5,871,824 A | 2/1999 | Bates et al. | |
| 5,876,561 A | 3/1999 | Tsai | |
| 5,897,701 A | 4/1999 | Soroushian et al. | |
| 5,945,044 A | 8/1999 | Kawai et al. | |
| 5,989,335 A | 11/1999 | Soroushian et al. | |
| 6,030,447 A | 2/2000 | Naji et al. | |
| 6,045,057 A | 4/2000 | Moor et al. | |
| 6,086,998 A | 7/2000 | Wihsmann et al. | |
| 6,138,430 A | 10/2000 | Van Acoleyen et al. | |
| 6,176,920 B1 | 1/2001 | Murphy et al. | |
| 6,228,215 B1 | 5/2001 | Hoffman, Jr. | |
| 6,245,196 B1 | 6/2001 | Martin et al. | |
| 6,325,853 B1 | 12/2001 | Hogan et al. | |
| 6,344,654 B1 | 2/2002 | Lesko | |
| 6,346,146 B1 | 2/2002 | Duselis et al. | |
| 6,346,165 B1 | 2/2002 | Markessini et al. | |
| 6,352,952 B1 | 3/2002 | Jardine et al. | |
| 6,353,952 B1 | 3/2002 | Wells | |
| 6,419,788 B1 | 7/2002 | Wingerson | |
| 6,475,275 B1 | 11/2002 | Nebesnak et al. | |
| 6,488,762 B1 | 12/2002 | Shi | |
| 6,506,248 B1 | 1/2003 | Duselis et al. | |
| 6,512,132 B2 | 1/2003 | Isoda et al. | |
| 6,528,151 B1 | 3/2003 | Shah et al. | |
| 6,562,743 B1 | 5/2003 | Cook et al. | |
| 6,572,697 B2 | 6/2003 | Gleeson et al. | |
| 6,613,424 B1 | 9/2003 | Putt et al. | |
| 6,676,744 B2 | 1/2004 | Merkley et al. | |
| 6,676,745 B2 * | 1/2004 | Merkley et al. | 106/726 |
| 6,719,878 B1 | 4/2004 | Svedman et al. | |
| 6,749,897 B2 | 6/2004 | Naji et al. | |
| 6,770,576 B2 | 8/2004 | Cook et al. | |
| 6,777,103 B2 | 8/2004 | Merkley et al. | |
| 6,837,452 B2 | 1/2005 | Dezutter et al. | |
| 6,872,246 B2 | 3/2005 | Merkley et al. | |
| 6,893,751 B2 | 5/2005 | Naji et al. | |
| 6,933,038 B2 | 8/2005 | Nanko et al. | |
| 6,942,726 B2 | 9/2005 | Cook et al. | |
| 7,028,436 B2 | 4/2006 | Bezubic, Jr. | |
| 7,081,184 B2 | 7/2006 | Wester et al. | |
| 7,226,525 B2 | 6/2007 | Vrbanac et al. | |
| 7,300,546 B2 | 11/2007 | Jewell et al. | |
| 7,344,593 B2 * | 3/2008 | Luo et al. | 106/726 |
| 7,455,727 B2 * | 11/2008 | Trevethick | 106/644 |
| 2002/0007926 A1 | 1/2002 | Jewell et al. | |
| 2002/0007927 A1 | 1/2002 | Vahatalo et al. | |
| 2002/0051892 A1 | 5/2002 | Laks et al. | |
| 2002/0059886 A1 | 5/2002 | Merkley et al. | |
| 2002/0069791 A1 | 6/2002 | Merkley et al. | |
| 2002/0088584 A1 | 7/2002 | Merkley et al. | |
| 2002/0112827 A1 | 8/2002 | Merkley et al. | |
| 2002/0121229 A1 | 9/2002 | Jardine et al. | |
| 2002/0170466 A1 | 11/2002 | Naji et al. | |
| 2002/0170467 A1 | 11/2002 | Naji et al. | |
| 2002/0170468 A1 | 11/2002 | Luo et al. | |
| 2002/0175126 A1 | 11/2002 | Naji et al. | |
| 2002/0179219 A1 | 12/2002 | Naji et al. | |
| 2002/0189499 A1 | 12/2002 | Naji et al. | |
| 2002/0189500 A1 | 12/2002 | Naji et al. | |
| 2002/0192510 A1 | 12/2002 | Naji et al. | |
| 2003/0000424 A1 | 1/2003 | Naji et al. | |
| 2003/0164119 A1 | 9/2003 | Naji et al. | |
| 2003/0213568 A1 | 11/2003 | Wester et al. | |

| | | | |
|---|---|---|---|
| 2003/0213569 A1 | 11/2003 | Wester et al. | |
| 2003/0213570 A1 | 11/2003 | Vrbanac et al. | |
| 2003/0213572 A1 | 11/2003 | Vrbanac et al. | |
| 2004/0043217 A1 | 3/2004 | Dezutter et al. | |
| 2004/0043686 A1 | 3/2004 | Batdorf | |
| 2004/0132843 A1 | 7/2004 | Baumgart et al. | |
| 2004/0145078 A1 | 7/2004 | Merkley et al. | |
| 2004/0168615 A1 | 9/2004 | Luo et al. | |
| 2005/0016423 A1 | 1/2005 | Merkley et al. | |
| 2005/0045067 A1 | 3/2005 | Naji et al. | |
| 2005/0126430 A1 | 6/2005 | Lightner et al. | |
| 2005/0208287 A1 | 9/2005 | Naji et al. | |
| 2005/0235883 A1 | 10/2005 | Merkley et al. | |
| 2007/0077436 A1 | 4/2007 | Naji et al. | |

FOREIGN PATENT DOCUMENTS

| | | | |
|---|---|---|---|
| AR | 015457 A1 | 9/1998 | |
| AR | 014046 A1 | 11/1998 | |
| AR | 014702 A1 | 3/1999 | |
| AT | 391131 B | 8/1990 | |
| AU | 515151 | 3/1981 | |
| AU | 2002240552 B2 | 9/2002 | |
| CA | 1177205 | 11/1984 | |
| CA | 2242749 | 2/1999 | |
| CA | 2405354 | 11/2001 | |
| CL | 32972 | 2/1980 | |
| CL | 2347-2001 | 9/2001 | |
| CL | 2353-2001 | 9/2001 | |
| CL | 461-2002 | 3/2002 | |
| CL | 2346-2001 | 8/2002 | |
| CL | 2352-2001 | 11/2002 | |
| CN | 1032332 A | 4/1989 | |
| CN | 1199116 A | 11/1998 | |
| CN | 1224701 | 8/1999 | |
| DE | 3037220 A1 | 4/1982 | |
| DE | 3308917 | 9/1984 | |
| DE | 3601736 A1 | 7/1987 | |
| DE | 4316666 C1 | 12/1994 | |
| DE | 19654836 A1 | 6/1998 | |
| EP | 0049365 A2 | 4/1982 | |
| EP | 0056263 | 7/1982 | |
| EP | 0287962 A1 | 10/1988 | |
| EP | 0305209 A1 | 3/1989 | |
| EP | 0331666 | 9/1989 | |
| EP | 0263723 A2 | 2/1991 | |
| EP | 484283 A1 | 5/1992 | |
| EP | 1052262 A2 | 11/2000 | |
| EP | 1088800 A2 | 4/2001 | |
| EP | 1106236 A1 | 6/2001 | |
| EP | 1155794 A2 | 11/2001 | |
| EP | 1346964 A2 | 9/2003 | |
| EP | 1334076 B1 | 8/2006 | |
| ES | 2033987 T3 | 4/1993 | |
| FR | 895184 | 1/1945 | |
| FR | 1557348 A | 2/1969 | |
| FR | 2611432 A1 | 9/1988 | |
| GB | 22139 | 0/1901 | |
| GB | 442098 | 2/1936 | |
| GB | 449384 | 6/1936 | |
| GB | 731597 | 6/1955 | |
| GB | 1003850 | 9/1965 | |
| GB | 1536663 | 12/1978 | |
| GB | 2041384 | 9/1980 | |
| GB | 1604910 | 12/1981 | |
| GB | 2137977 | 10/1984 | |
| GB | 2307425 | 5/1997 | |
| JP | 55085756 A | 6/1980 | |
| JP | 59203747 | 11/1984 | |
| JP | 61019900 A | 1/1986 | |
| JP | 63107849 A | 5/1988 | |
| JP | 01141849 A2 | 6/1989 | |
| JP | 03016978 | 1/1991 | |
| JP | 04182335 A | 6/1992 | |
| JP | 04342746 A | 11/1992 | |
| JP | 5177625 A2 | 7/1993 | |
| JP | 05184246 A2 | 7/1993 | |
| JP | 06024821 | 2/1994 | |
| JP | 06144911 | 5/1994 | |
| JP | 6341093 | 12/1994 | |
| JP | 07041592 A2 | 2/1995 | |
| JP | 07-109165 | 4/1995 | |
| JP | 08119708 | 5/1996 | |
| JP | 2508554 | 6/1996 | |
| JP | 10095922 A2 | 4/1998 | |
| JP | 11010631 | 1/1999 | |
| JP | 11099512 A | 4/1999 | |
| JP | 2001240458 A | 9/2001 | |
| JP | 2001316163 A | 11/2001 | |
| JP | 2003335560 | 11/2003 | |
| KR | 1019950008587 B1 | 8/1995 | |
| PL | 154782 B1 | 9/1991 | |
| SU | 240472 | 3/1969 | |
| WO | WO-8404765 | 12/1984 | |
| WO | WO-9101409 | 2/1991 | |
| WO | WO-9520066 | 7/1995 | |
| WO | WO-9617996 | 6/1996 | |
| WO | WO-9708111 | 3/1997 | |
| WO | WO-9731153 | 8/1997 | |
| WO | WO-9818855 | 5/1998 | |
| WO | WO-9827027 | 6/1998 | |
| WO | WO-9845222 | 10/1998 | |
| WO | WO-9935330 | 7/1999 | |
| WO | WO-0071336 | 11/2000 | |
| WO | WO-0130927 | 5/2001 | |
| WO | WO-0168547 | 9/2001 | |
| WO | WO-0181666 | 11/2001 | |
| WO | WO-0212623 | 2/2002 | |
| WO | WO-0218486 | 3/2002 | |
| WO | WO-0228795 | 4/2002 | |
| WO | WO-0228796 | 4/2002 | |
| WO | WO-0233164 | 4/2002 | |
| WO | WO-02070425 | 9/2002 | |
| WO | WO-02072499 | 9/2002 | |
| WO | WO-2004063113 A2 | 7/2004 | |

OTHER PUBLICATIONS

Energy Seal "Elastomeric Wall Coatings" located at http://www.energy-seal.com/es-home.nsf/products/everlast, Aug. 14, 2004.

"Forming Handsheets For Physical Tests of Pulp," TAPI, T 205 sp-95, 1995, pp. 5-7.

Moisture in Pulp, Paper and Paperboard, TAPPI, T 412 om-94, pp. 1-3; 1994.

Harper, S., et al. "Resin Extraction and Effects on Pulp Quality," Proceedings of the 54th Appita Annual Conference, Melbourne, Apr. 3-6, 2000, pp. 575-580.

Stromberg, C.B., "Washing For Low Bleach Chemical Consumption," in Thomas W. Joyce (ed.), Environmental Issues: A TAPPI Press Anthology of Published Papers, TAPPI Press, Atlanta, 1990 pp. 230-238.

Stromberg, C.B. "Washing of Dissolved Organic Solids From Pulp" Paper Asia, Oct. 1994, pp. 32-39.

SCAN-Test Method C 45:00, "COD and TOC Removable By Washing," Scandinavian Pulp, Paper and Board Testing Committee, Revised 2000.

SCAN-Test Method CM 45:91, "Water-Soluble Organic Matter," Scandinavian Pulp, Paper and Board Testing Committee, 1991.

Third Party Observation by Redco NV in EP Application No. 04700639.0 filed Aug. 23, 2006.

International Search Report for PCT/AU03/01315 dated Nov. 12, 2003.

International Search Report for PCT/US01/42243 (WO 02/028796 A2) dated May 15, 2002.

Written Opinion for WO 02/028796 A2 (PCT/US01/42243) dated Feb. 4, 2003.

International Search Report for PCT/US05/007581 dated Aug. 3, 2005.
International Preliminary Report on Patentability for PCT/US2005/007581 dated Jun. 19, 2007.
Letter to European Patent Office from REDCO dated Aug. 1, 2008 (14 pgs., w/translation).
Documents from the Examination Procedure of European Patent Application No. 05075809.3, submitted to European Patent Office on Aug. 1, 2008 by REDCO.
Locher, Friedrich W. "Fundaments of Production and Application" VBT; 2000.
Submission in opposition proceeding of EP 1330571 entitled "Effect of the Extraction Temperature upon the COD value of a Cellulose Pulp" dated Aug. 1, 2008, 1 pg.
Pre-extraction of hemicelluloses and subsequent kraft pulping Part I: alkaline extraction, TAPPI Journal (Jun. 2008) 6 pgs.
Letter from Saint Gobain to EPO in opposition proceedings of EP1330571 dated Aug. 1, 2008 (3 pgs.).
Berry, Craig, "Determination of the Influence of Pulp Chemical Oxygen Demand on the Flexural Strength of Cured Fibercement" (11 pgs), submitted in opposition proceeding of EP1330571, Aug. 1, 2008.
Office action for U.S. Appl. No. 10/753,089 (2004/0168615) mailed Jan. 16, 2008.
Amendment filed Oct. 31, 2007 for U.S. Appl. No. 10/753,089 (2004/0168615).
Information Disclosure Statements for U.S. Appl. No. 10/753,089 (2004/0168615) filed Sep. 28, 2007 and Oct. 29, 2007.
Notice of Opposition to EP-B-1330571 filed by Redco on Dec. 15, 2006.
Notice of Opposition to EP-B-1330571 filed by St. Gobain Materiaux dated Jan. 19, 2007.
U.S. Appl. No. 10/070,218 entitled "Extrudable Cementitious Material;" filed Jul. 19, 2002.
Expert Declaration of Prof. Dr. Dahl, with CV (Jan. 28, 2009).
Expert Declaration of Prof. Dr. Roffael (Jan. 28, 2009).
MacDougall, F.H., Excerpt "Reactions in Heterogeneous Systems" Thermodynamics and Chemistry (1921), title page and p. 64.
Technical File by Louisiana-Pacific Samao, Inc., sent to Redco on May 5, 1999.
Declaration by Bill Adams and accompanying documents, Weyerhauser, dated prior to Oct. 17, 1999.
M.D. Campbell and R.S.P. Coutts, "Wood Fibre-Reinforced Cement Composites," in Journal of Materials Science, 15 (1980), pp. 1962-1970.
Coutts, R.S.P., "From forest to factory to fabrication," in Fibre Reinforced Cement and Concrete, ed. R.N. Swamy, E & FN SPON, London, 1992, pp. 31 to 47.
Extract from Webster's Third New International Dictionary of the English Language unabridged, ed Merriam-Webster Inc., Springfield, 1986.
Woods, Amy Lamb "Keeping a Lid on It: Asbestos-Cement Building materials" www.cr.nps.gov/hps/tps/recentpast/asbestosarticle.htm, Aug. 2000, 12 pgs.
Chapter 5, Asbestos Cement Products, In Asbestos and Certain Asbestos Products: A Report on the Supply of Asbestos and Certain Asbestos Products, Competition Commission, Southampton Row, London, 1970-1975, pp. 25-40.
Babachev et al, "Plasticizing effect of aliphatic amines on cements," Build Sci Inst. Sofia Bulgaria; Epitoanyag, Chemical Abstracts on STN 24(11), 430-5 (1972).
Chemical Abstracts "Lightweight cement moldings." American Chemical Society, Columbus, US, vol. 104:114971, XP000183799, ISSN: 0009-2258, Apr. 7, 1986.
Hawley's Condensed Chemical Dictionary, definition of "dispersing agent," Richard Lewis Sr., Twelfth Edition, Van Nostrand Reinhold, 1993, p. 435.
Shapiro, A.D., et al., "Manufacture of Board Resistant to Biological Degradation," Bumazhnaya Promyshiennost 36, 12, XP-002335287 (1961).
XP002197953 & JP 2001 240458 A, Kamishima Kagaku Kogyo KK) Database WPI, Section Ch, Week 200212, Derwent Publications Ltd., London, GB; AN 2002-085436, Sep. 4, 2001 abstract.
Finnish Forest Industries Federal, "Mechanical Pulp Production" located at http://english.forestindustries.fi/products/pulp/mechanical.html, Nov. 10, 2004 (2 pgs).
Ekman et al., "Studies on the Behavior of Extractives in Mechanical Pulp Suspensions," The Institute of Paper Science and Technology; Jun. 1990.
Soroushian, Parviz "Development of Specialty Cellulose Fibers and Cementitious Matrices for Cellulose Fiber Reinforced Cement Composites" 1989.
Lin et al., "Improvements in the Durability of Cellulose Reinforced Cementitious Composites," Mechanisms of Chemical Degradation of Cement based systems, Proceedings of the Materials Research Society's Symposium of Mechanisms, Boston, Nov. 27-30, 1995.
Neithalath, Narayanan, et al "Acoustic Performance and Damping Behavior of Cellulose Cement Composites," Cement & Concrete Composites 25 (2003).
Mai et al., "Effects of Water and Bleaching on the Mechanical Properties of Cellulose Fiber Cements" Journal of Materials Science 18 (1983) pp. 2156-2162.
Mai et al., "Slow Crack Growth in Bleached Cellulose Fibre Cements" Journal of Materials Science Letters 3 (1984), p. 127-130.
JUBOCID "Special Anti-Mildew Coatings" Sep. 2002, 4 pgs.
Thai MDF Board Co., Ltd "Beger Synotex Acrylic TM 100% Emulsion Paint" at: http://www.thaimdf.com/paint_roofpaint.htm, 2003, 2 pp.
Hardi-Plank and Surface Mold, article located at internet http://www.nefsi.org/wwwboard/messages/439.html (Jun. 13, 2003) 2 pgs.
FORCE 10 Caribbean "Custom Features" Engineered Building Systems (1999) 5 pgs.
Rozman et al., "Improvements of Fibreboard Properties through Fibre Activation with Silane," Intern. J. Polymeric Mater., vol. 32 (1996) pp. 247-257.
Blankenhorn et al., "Temperature and Moisture Effects on Selected Properties of Wood Fiber-Cement Composites" Cement and Concrete Research 29 (1999) pp. 737-741.
Redco NV, Observation by a Third Party for EP Application No. 01975765.7, Jul. 2, 2010.
Redco NV, Observation by a Third Party for EP Application No. 01973377.3, Jun. 25, 2010.
EPO Communication under Rule 71(3) EPC for EP Appl. No. 01973377.3, Jul. 7, 2010.

* cited by examiner

FIG. 2 SEVERAL EMBODIMENTS OF FIBER DISPERSANT TREATMENT BY DRY SPRAY

FIBER REINFORCED CEMENT COMPOSITE MATERIALS USING CHEMICALLY TREATED FIBERS WITH IMPROVED DISPERSIBILITY

RELATED APPLICATIONS

This application is a continuation-in-part of U.S. application Ser. No. 09/969,742, filed on Oct. 2, 2001, entitled FIBER CEMENT COMPOSITE MATERIALS USING SIZED CELLULOSE FIBERS. This application also claims the benefit of U.S. Provisional Application No. 60/274,414, filed on Mar. 9, 2001. The entirety of each of these applications is hereby incorporated by reference.

BACKGROUND OF THE INVENTION

1. Field of the Invention

This invention in one embodiment relates to the chemical treatment of cellulose fibers to impart the fiber with improved dispersibility and reinforcing efficiency in fiber reinforced composite materials. More particularly, in one embodiment, this invention relates to cellulose fiber reinforced cement composite materials using chemically treated fibers with improved dispersibility, including fiber treatment methods, formulations, methods of manufacture and final products with improved material properties relating to the same.

2. Description of the Related Art

Fiber-reinforced cement products such as building sheets, panels, planks and roofing have been used for building construction for more than one hundred years. Reinforcing fibers used in such building products include asbestos fibers, cellulose fibers (see, e.g., Australian Patent No. 515151, U.S. Pat. No. 6,030,447), metal fibers, glass fibers and other natural or synthetic fibers. In recent years, the use of asbestos fibers has decreased substantially due to health concerns associated with the exposure and inhalation of asbestos fibers. As a viable alternative, wood cellulose has become one of the predominant fibers used in commercial fiber-reinforced building materials because it is an effective, low cost, renewable natural reinforcement fiber compatible with common fiber cement manufacturing processes, including the autoclave process.

However, cellulose reinforced fiber cement materials can have performance drawbacks such as lower reinforcing efficiency, lower strength and toughness due to poor fiber dispersion and uneven fiber distribution in the cement mix. These drawbacks are largely due to the hydrophilic nature of cellulose fibers. It is generally understood that cellulose fibers are primarily polysaccharides comprised of five or six carbon sugars that have multiple hydroxyl and carboxyl functional groups. These functional groups provide cellulose fibers with a strong tendency to form hydrogen intra-fiber and inter-fiber bonds. Hydrogen bonding between fibers often results in the formation of fiber clumps or clusters. The fiber clusters are difficult to disperse in a cementitious mixture even with the help of hydrapulping and refining processes as described in Australian Patent No. 515151. These fiber clusters are even more difficult to disperse in dry and semi-dry processes such as extrusion, molding, Magnani and casting. Moreover, hydrogen bonding between different hydroxyl groups of the same fiber is likely to promote fiber curling or forming fiber balls, which can also result in lower fiber reinforcement efficiency.

For example, when the fibers are dried in the process of forming sheets, the hydrogen bonding within and among cellulose molecules is sufficiently strong such that complete dispersion or fiberization of the dried fibers by mechanical means is extremely difficult to achieve. Use of poorly dispersed or fiberized fibers in fiber cement composite materials usually results in uneven fiber distribution and lower reinforcing efficiency, which in turn can lead to lower strength, toughness, and strain in the final fiber cement product. Thus, in order to achieve a certain level of reinforcement, substantially more fibers are needed to compensate for the uneven fiber distribution in the cementitious matrix, which in turn can significantly increase the material cost.

A number of prior art references disclose methods of improving fiber dispersion in a cementitious mix. However, all of these references are directed toward using mechanical action to break the bonds between fibers. For example, U.S. Pat. No. 3,753,749 to Nutt discloses milling or otherwise mechanically preparing the fibers beforehand so that the fibers can be uniformly distributed in a concrete mix. U.S. Pat. No. 5,989,335 to Soroushian discloses using mechanical action to reduce the bonding between fibers so that the fibers can be dispersed in conventional concrete mixes. One disadvantage of using mechanical means to break the inter-fiber bonding is that once the mechanically dispersed fibers are placed in the concrete mix, hydrogen bonds can again form between the fibers and cause the fibers to re-cluster in the mix.

In the paper industry, some research has been directed toward chemically treating cellulose fibers to reduce the fiberization energy needed to fiberize the pulp. Since high energy is typically required to fiberize pulp with strong inter-fiber hydrogen bonding, efforts have been made to reduce the hydrogen bonding among fibers in the pulp by adding organic and/or inorganic chemicals called debonders to lower the fiberization energy requirement. The debonders are typically surfactants but can also be inorganic fillers. These treated fibers have been developed primarily for applications in diaper and sanitary napkin manufacturing.

Thus far, these chemically treated fibers have been used exclusively in the paper industry for the purpose of reducing fiberization energy during fiberization processes such as hammermilling. There has been no motivation to use these chemically treated fibers to improve fiber dispersion as fiber dispersion is generally not a concern for the papermaking industry since the majority of the papermaking processes such as Fourdrinier, cylinder (Hatschek) and twin-wire use very dilute fiber slurry. The fiber consistencies in these slurries are typically between about 0.01% to 4%. At such low consistencies, water will break most of the inter-fiber hydrogen bonds while the remaining fiber clusters can be easily dispersed using mechanical means such as hydrapulping, pumping, deflakering and refining.

Poor fiber dispersion continues to pose a serious problem in the manufacture of fiber reinforced cement composite materials, especially when long fibers are used in a dry or semi-dry process wherein fiber dispersion is even more difficult to achieve. The fiber cement mixture typically has a solid content of about 30% to 80% by weight in a dry or semi-dry process such as extrusion, casting or molding processes. At such high solid concentrations, fiber dispersion cannot be achieved by dilution, solvency, or agitation. As a consequence, poorly dispersed fiber bundles or clusters often lead to severe defects in the final product, including a significant loss in mechanical properties. The high alkalinity of the aqueous fiber cement system (pH commonly higher than 10, also promotes the hydrogen bonding among fibers, which can make the fibers more difficult to disperse in a cementitious mixture than in most conventional paper-making systems where the pulp slurry is typically under acidic or neutral conditions.

Accordingly, there is a need for a fiber that can be readily dispersed and uniformly distributed in fiber reinforced composite building materials. There is also a need for a fiber reinforced building material having improved fiber distribution and reinforcing efficiency, and material formulations and processes for manufacturing the same.

SUMMARY OF THE INVENTION

Certain preferred embodiments of the present invention provide a building material incorporating reinforcing fibers wherein at least a portion of the fibers are chemically treated to substantially improve the dispersibility of the fibers. In one embodiment, the fibers are at least partially treated with a dispersant so that the fibers can remain substantially dispersed in a mixture even after mechanical mixing of the fibers, thereby substantially reducing the occurrence of re-clustering or clumping of the fibers in the mixture. Preferably, the dispersant binds hydroxyl groups on the fiber surface so as to substantially inhibit bonding between hydroxyl groups of different fibers, thereby substantially reducing inter-fiber hydrogen bonding. In one embodiment, the dispersant physically blocks the hydroxyl groups so as to substantially prevent the hydroxyl groups from bonding with hydroxyl groups of different fibers, and/or of the different sites of the same fiber. In another embodiment, the dispersant comprises at least one functional group that chemically bonds to the hydroxyl groups on the fiber surface in a manner so as to substantially prevent the hydroxyl groups from bonding with hydroxyl groups of different fibers and/or other hydroxyl groups of the same fiber. The dispersants can include, but are not limited to, organic and/or inorganic chemicals such as surfactants and debonders that make the fiber surface more hydrophobic and thus more dispersible in an aqueous environment.

One preferred formulation of a building material made in accordance with preferred embodiments of the present invention comprises a cementitious binder, preferably Portland cement; an aggregate, preferably silica which may be fine ground if it is to be autoclaved; cellulose fibers, at least some of the cellulose fibers having surfaces that are at least partially treated with a dispersant so as to make the surfaces hydrophobic and the fibers more readily dispersible; and one or more additives. In one embodiment, the dispersant comprises a hydrophilic functional group and a hydrophobic functional group, wherein the hydrophilic group permanently or temporarily bonds to hydroxyl groups on the fiber surface in the presence of water or an organic solvent in a manner so as to substantially prevent the hydroxyl groups from bonding with other hydroxyl groups. The hydrophobic group is positioned on the fiber surface, repelling water and other treated hydrophobic fibers therefrom. Preferably, the dispersants comprise from about 0.001% to 20% of the oven-dried weight of the fibers. In one embodiment, the cellulose fibers comprise individualized fibers wherein the lignin of the fibers is chemically removed.

A method of manufacturing a fiber reinforced composite building material using the formulations described constitutes another embodiment of the present invention. One preferred method comprises providing cellulose fibers and treating at least a portion of the cellulose fibers with a dispersant. The dispersant physically blocks and/or chemically bonds to at least some of the hydroxyl functional groups on the fiber surface, thereby substantially diminishing inter-fiber hydrogen bonding and making the fibers more dispersible in a mixture. In another embodiment, the cellulose fibers comprise chemically treated fluff pulps used in the paper industry for purposes of reducing the fiberization energy. The chemically treated fibers have improved dispersibility and are mixed with a cementitious binder and other ingredients to form a fiber cement mixture. The fiber cement mixture is formed into a fiber cement article of a pre-selected shape and size. The fiber cement article is cured so as to form the fiber reinforced composite building material.

Some of the above steps can be omitted or additional steps may be used, depending on the particular application. The step of treating the fibers with a dispersant preferably comprises treating the fibers with inorganic compounds, organic compounds, or combinations thereof using techniques involving dry spraying or solution treatment, although other methods of applying dispersants are feasible, such as coating, and impregnation. In one embodiment, each of these techniques preferably occurs in the presence of water or an organic solvent. Preferably, the step of mixing the chemically treated fibers with ingredients to form a fiber cement mixture comprises mixing the chemically treated fibers having improved dispersibility with non-cellulose materials such as cementitious binder, aggregate, and additives in accordance with preferred formulations described herein. In another embodiment, the chemically treated fibers having improved dispersibility can also be mixed with conventional untreated cellulose fibers, fluff fibers, and/or natural inorganic fibers, and/or synthetic fibers along with other ingredients. The fabrication processes can be any of the existing technologies such as extrusion, molding, casting, injection molding, multi-wire forming and Hatschek processing, etc.

Application of the chemically treated fibers of the preferred embodiments improves the fiber dispersion and reinforcing efficiency in the building material, which in turn improves key mechanical and physical properties of the material. In one embodiment, incorporation of the chemically treated fibers with improved dispersibility in the building material increases the modulus of rupture (MOR) by more than about 5%, and/or increases the toughness by at least about 5%, more preferably by about 20%, and/or increases the strain by more than about 5%, and/or increases the z-direction tensile strength by at least about 5%, more preferably more than about 10%, when compared with a building material made with an equivalent formulation without the chemically treated fibers. Moreover, less cellulose fibers may be required in making composite materials of substantially the same physical and mechanical properties because chemically treated fibers with improved dispersibility substantially obviate the need to add additional fibers to the cementitious mix to compensate for fiber clumping or clusters. These and other advantages will become more fully apparent from the following description taken in conjunction with the accompanying drawings.

DETAILED DESCRIPTION OF THE PREFERRED EMBODIMENTS

Figure 1:
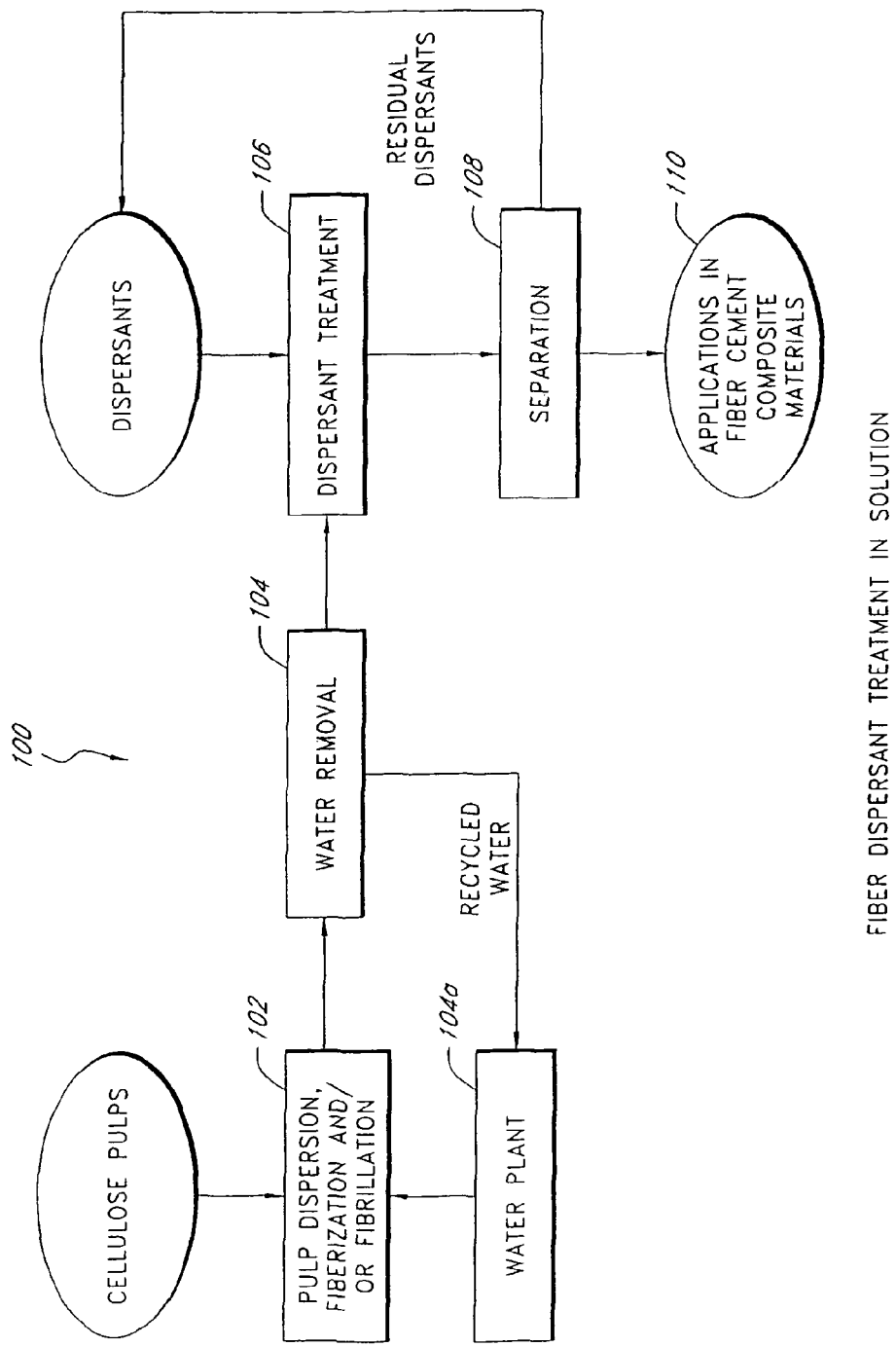
FIG. 1 illustrates an exemplifying process flow of one embodiment of treating fibers with dispersants in solution.

The preferred embodiments of the present invention relate generally to the chemical treatment of cellulose fibers to impart improved fiber dispersibility and the use of these chemically treated fibers with improved dispersibility in cementitious fiber reinforced composite building materials. The processing methods of chemically treating the fibers to make them more readily dispersible, formulations of composite materials using these chemically treated fibers, and improvements in the mechanical and physical properties of the final composite material are also described.

Chemically treated fibers with improved dispersibility are generally defined to include fibers that can be more readily distributed throughout a mixture such as a cementitious matrix and remain substantially dispersed even after mechanical mixing action stops. In contrast to fibers that are dispersed primarily by mechanical means, these chemically treated fibers, when incorporated into a mixture, remain substantially dispersed in the mixture without re-clustering or clumping once the mixing action stops.

Fibers with Improved Dispersibility

In one embodiment, this invention relates to the application of chemically treated fibers with improved dispersibility into cementitious cellulose fiber reinforced building materials. The chemically treated fibers generally comprise fibers that are treated with one or more chemical compounds (dispersants) that inhibit the fibers from forming inter-fiber bonds. In one preferred embodiment, the dispersants bind the hydroxyl functional groups on the fiber surface either by physically blocking the site or chemically bonding to the hydroxyl groups so as to substantially prevent the hydroxyl groups from forming hydrogen bonds with hydroxyl groups on adjacent fibers. The dispersants may be applied to both long and short cellulose fibers to impart the fibers with improved dispersibility. Long fiber is herein defined as fibers with a length-weighted average length of longer than about 1 mm, and short fiber is defined as fibers with length-weighted average length of less than about 1 mm. Preferred embodiments of the present invention can be applied to, but is not limited to, fibers having length-weighted average length of about 0.01 to 7.0 mm.

Dispersant Chemicals and Cellulose Fibers for Fiber Treatment

The chemicals selected for improving fiber dispersibility are preferably chemicals that cause the fiber surface to become more hydrophobic and/or can significantly reduce the occurrence of inter-fiber bonding, thus making the fibers substantially more readily dispersible. In one embodiment, the dispersants attach to the fiber surface in a manner such that the dispersants physically block the hydroxyl groups on the fiber surface from contacting adjacent fibers, thereby significantly weakening the effects of hydrogen bonding between hydroxyl groups of adjacent fibers. In another embodiment, the dispersants contain functional groups that chemically bond to hydroxyl groups on the fiber surface so as to inhibit formation of hydrogen bonding between hydroxyl groups of different fibers. Chemicals that can be used as dispersants in the fiber treatment process of the preferred embodiments include but are not limited to:

polyamine compounds;

cationic quaternaryamine compounds including alkyltrimethyl quaternary ammonium salts, dialkyldimethyl quaternary ammonium salts, benzylalkyl chlorides, ethoxylated quaternary ammonium salts, propoxylated quaternary ammonium salts, etc.

cationic, anionic, and non-ionic surfactants;

combinations of cationic and non-ionic surfactants or of anionic and non-ionic surfactants;

commercially available chemicals that are commonly known in the paper industry as fluff pulp debonders such as: Berocell 587K, 584, 509, 509HA and 614 from EKA Chemicals Inc. of Marietta, Ga.; EMCOL CC-42 from Witco Chemicals Inc. of Greenwich, Conn.; and Quaker 3190 and 2028 from Hercules Inc. of Kalamazoo, Mich.;

alkylalkoxylsilane, alkoxylsilane, and halide organosilane.

Additionally, other commercially available chemicals such as surfactants and debonders can also be applied to the fibers as dispersants in the preferred fiber treatment process. It will be appreciated that the above list of chemical compounds is merely illustrative of examples of substances that can be used to treat the fibers to impart improved dispersibility. The dispersant can also be other suitable organic or inorganic compounds, or combinations thereof, depending on the particular attributes needed for the specific application of the fiber cement material.

Cellulose fibers that are used for chemical treatment with a dispersant can be made by various pulping methods. In the pulping process, wood or other lignocellulosic raw materials such as kenaf, straw, and bamboo, etc., are reduced to a fibrous mass by the means of rupturing the bonds within the structures of the lignocellulosic materials. This task can be accomplished chemically, mechanically, thermally, biologically, or by combinations of these treatments. Based on the chemicals utilized in the process, the chemical pulping methods are classified as Soda, Kraft, Kraft-AQ, Soda-AQ, Oxygen Delignification, Kraft-Oxygen, Solvent methods, and Sulfite pulping, steam explosion or any other pulping techniques. In some embodiments, cellulose fibers are separated into individual fibers by rupturing the bonds between lignin and cellulosic components. Lignin, which acts as a glue holding cellulose and hemicellulose together to provide mechanical strength in the wood, is broken and dissolved by chemical reactions. These chemical reactions for individualizing the fibers can be carried out in a reactor, often called a digester, under a high temperature around 150 to 250° C. for about 30 minutes to 3 hours.

The cellulose fibers used for the dispersant treatment can be unrefined/unfibrillated or refined/fibrillated cellulose pulps from sources, including but not limited to bleached, unbleached, semi-bleached cellulose pulp produced by various pulping techniques. The cellulose pulps can be made of softwood, hardwood, agricultural raw materials, recycled waste paper or any other form of lignocellulosic materials.

Furthermore, the cellulose fibers used can be engineered cellulose fibers such as loaded fibers described in Applicant's copending application entitled FIBER CEMENT COMPOSITE MATERIALS USING CELLULOSE FIBERS LOADED WITH INORGANIC AND/OR ORGANIC SUBSTANCES, Ser. No. 09/969,957, filed on Oct. 2, 2001, and/or sized fibers described in Applicant's copending application entitled FIBER CEMENT COMPOSITE MATERIALS USING SIZED CELLULOSE FIBERS, Ser. No. 09/969,742, filed on Oct. 2, 2001, and/or biocide treated fibers described in Applicant's copending application entitled FIBER CEMENT COMPOSITE MATERIALS USING BIOCIDE TREATED DURABLE CELLULOSE FIBERS, Ser. No. 09/969,964, filed on Oct. 2, 2001. The entirety of each of these applications is hereby incorporated by reference.

Fiber Treatment

Various methods can be used to treat cellulose fibers with one or more dispersants. A preferred fiber treatment method generally includes the following steps performed in various sequences:

fiber dispersion/fiberization;
fibrillation (mechanical means to increase fiber surface area);
fiber conditioning (dewatering, drying or dilution);
treatment with one or more dispersants;
removal of residual/excessive dispersants; and
conditioning of the chemically treated fibers (drying, humidifying or dispersing).

Some of these steps can be omitted or some other steps may be desirable. The fiber treatment method can be carried out by various means including but not limited to treatments in aqueous or organic solvent solutions, and/or treatments by vacuum or pressure spraying of the dispersant on dried or wet cellulose fibers.

Fiber Treatment in Solution

FIG. 1 illustrates an embodiment of a preferred fiber treatment process 100 that is carried out in solution. The process 100 begins with step 102 in which untreated cellulose fibers are dispersed, fiberized (individualized) and/or fibrillated. The fibers are dispersed at this stage by mechanically breaking at least some of the inter-fiber bonding to separate the fibers from each other. However, this dispersing step 102 typically does not provide the fibers with sufficient dispersibility such that the fibers remain substantially uniformly distributed when incorporated into a cementitious matrix. At least some of the inter-fiber hydrogen bonds that are broken by mechanical action during this dispersing step 102 tend to re-form in a mixture once the mechanical mixing action stops, thereby causing the fibers to re-cluster or clump together in the mixture.

Furthermore, individualizing of fibers can occur in a chemical pulping process. Alternatively, it will be appreciated that in performing this preferred manufacturing process, the chemical pulping step may not be necessary. This is because chemical individualization of fibers is often done by the fiber manufacturer, who then provides the fibers to the buyer on standard lap sheets or rolls. The process 100 can also be applied to fibers that are not chemically individualized. Thus, in one embodiment, the individualization of such fibers merely includes mechanically separating the fibers from the sheets or rolls, such as by hammer milling or other methods.

In one embodiment, the untreated cellulose fibers are received in dry form (laps and rolls) or in wet forms (wet laps and in containers). Preferably, the untreated fibers are mechanically dispersed at a consistency of about 1%-6% to form pulp slurry in a hydrapulper, which also imparts some fibrillation. Further fibrillation can be achieved using a refiner or a series of refiners. Once dispersed, the fibers are then fibrillated to a range of about 0 to 800 degrees of Canadian Standard Freeness (CSF), more preferably about 100 to 700 degrees of CSF. Dispersion and fibrillation can be achieved by other techniques such as, for example, deflakering, milling, and shredding. However, use of chemically treated fibers without extensive fibrillation is also acceptable, or even preferred, for some products and processes.

In the embodiment shown in FIG. 1, subsequent to dispersing the fibers in step 102, the process 100 continues with step 104 in which fibrillated or unfibrillated fibers in slurry forms are then de-watered using press filtration, vacuum filtration or continuous centrifugation to a total solid content of about 2% to 50%. Further de-watering of the fibers can be accomplished by vacuum evaporation drying, flash drying, freeze drying, low temperature oven drying, and other drying techniques that do not pose significant damages to the fiber integrity. In one embodiment, the de-watered fibers are thoroughly mixed in a reactor vessel using dispensers, mixers, or hydrapulpers of any kind. As shown in FIG. 1, the water from the dewatering step 104 can be recycled to the water plant 104a and circulated back to step 102.

The process 100 then follows with step 106 in which dispersant treatment reactions are carried out. Preferably, prepared dispersants are added to the reactor while constant agitation and mixing are applied. In one embodiment, the dispersants comprise surfactants such as quaternaryamine, polyamine, and combinations thereof. Preferably, dosage of the dispersants is up to about 20% of the oven dry mass of the cellulose pulp. Preferably, the dispersants bind the hydroxyl groups on the fiber surface so as to inhibit the hydroxyl groups from forming hydrogen bonds with hydroxyl groups on adjacent fibers. Weakening of inter-fiber hydrogen bonding and/or formation of a hydrophobic cloud surrounding the surfactant treated fibers permit the fibers to become more readily dispersible in solution and inhibits the fibers from clustering once the mechanical mixing action stops. However, the reactor systems are preferably equipped with some kinds of agitation devices to ensure a good mixing.

The dispersant treatment reactions can be carried out in the ambient or at an elevated temperature up to about 250° C., more preferably below 150° C. The retention time varies, depending on the particular dispersant, but preferably ranges from about 30 seconds to 24 hours. Batch or continuous reactors of all kinds can be used but continuous or semi-continuous tank or plug flow reactors are preferred for the fiber treatment in this embodiment.

After a predetermined retention time is reached, the residual dispersants can be separated and removed by centrifugation or filtration as shown in step 108 of the process 100. In one embodiment, the residual dispersants are recycled and reused. The post reaction fibers are preferably dried by low temperature oven, vacuum evaporation, and other non-destructive drying techniques. The treated fibers are then incorporated into fiber cement composite materials in step 110.

TABLE 1

Dispersant Treatment Conditions of Some Embodiments

| Parameters | Ranges | More Preferable |
| --- | --- | --- |
| Percent of Fibers in Slurry (% by weight) | about 0.01 to 70 | about 0.5 to 10 |
| Fiber Freeness after Fibrillation (CSF) | about 0 to 800 | about 100 to 700 |
| Dosage of Dispersants (% by fiber weight) | about 0.001 to 20 | about 0.01 to 10 |

Table 1 provides examples of reaction conditions of the fiber treatment process 100 described above. However, various changes and modifications in the conditions can be made from the embodiments presented herein without departing from the spirit of the invention.

Fiber Treatment by Dry Spray

Figure 2:
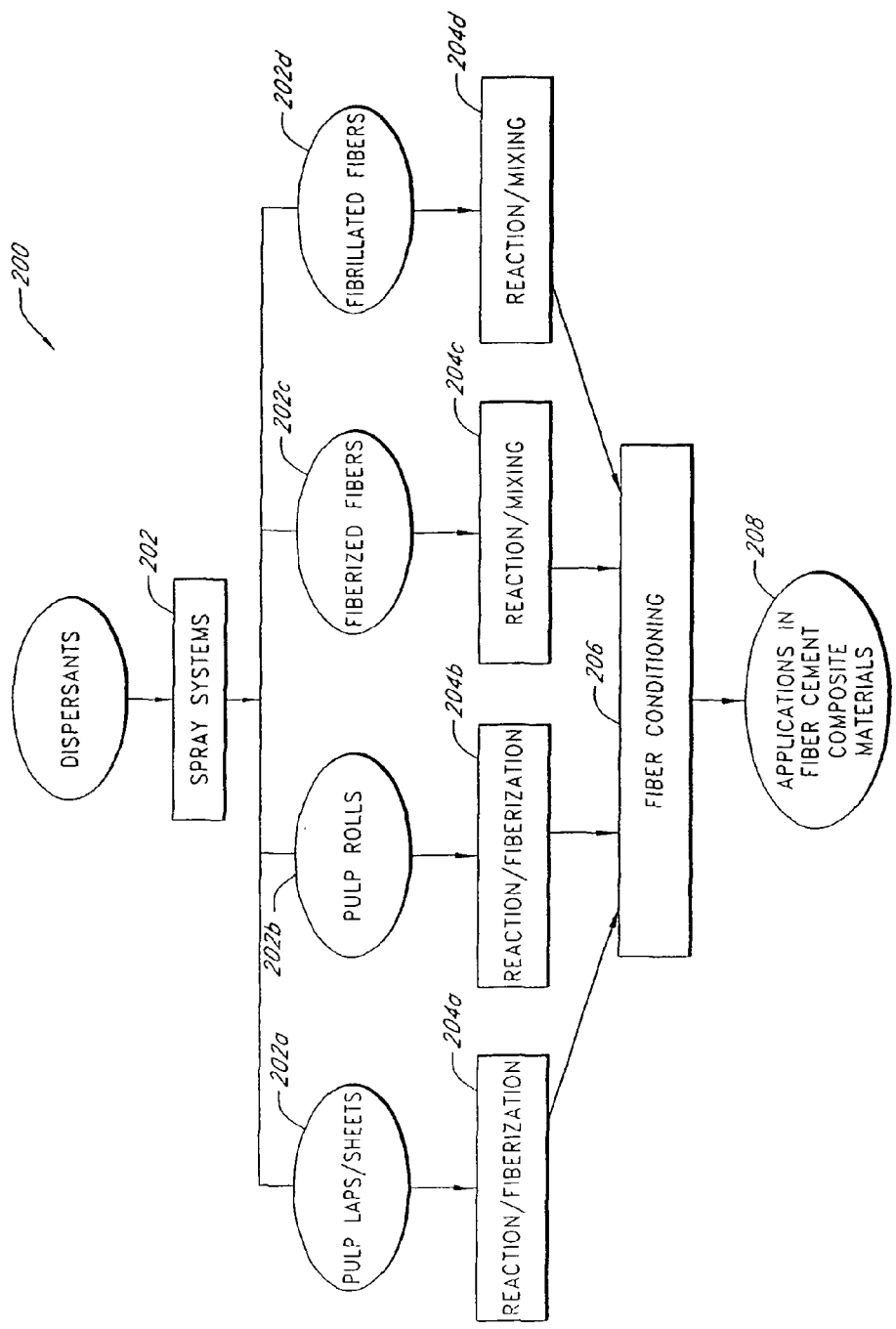
FIG. 2 illustrates exemplifying process flows of several embodiments of treating fibers with dispersants using a dry spray process.

FIG. 2 illustrates several embodiments of treating fibers by dry spraying. The process 200 begins with step 202 in which the raw materials are prepared for the treatment. The untreated fibers can be received in various forms such as pulp laps (sheets) in bales 202a; pulp sheets in rolls 202b; fiberized (hammermill or shredded) fibers in bales, containers, or silos

202c; fibrillated (refined) dry or semi-dry fibers in bales, silos or containers 202d; and other dry forms of cellulose fibers.

As shown in FIG. 2, in the step of treating pulps in forms of rolls or laps/sheets 202a and 202b, dispersants are sprayed onto cellulose fibers as shown in steps 204a and 204b. The dispersants may react with molecules on the fiber surface before, during or after fiberization process. In these spraying systems, the dispersants may be vaporized and the vaporized chemicals may be pressurized to provide enough spraying velocities. Some carrying gases may be used for spraying the dispersants in latex emulsions. Preferably, the nozzles are selected to generate the finest spraying particles possible.

In another embodiment of this treatment, dispersants are applied onto pulp laps, rolls or sheets by dipping the pulp webs in solution of the dispersants. After a predetermined retention time to allow dispersants to react with the fibers, the pulps are then individualized or fiberized by techniques such as hammer milling, shredding, roller milling, deflakering, or refining. Dispersant reactions and fiberization can also be carried out at the same time by spraying the chemicals on to the fibers during fiberization processes. As FIG. 2 further shows, in treating fiberized fibers 202c, dispersants will be sprayed onto the fiberized fibers as shown in step 204c. The dispersant reactions are allowed to take place in a reactor with vigorous agitation/mixing. The dispersant treatment can also be carried out in systems such as flash dryers, hammermills, conventional resin application chambers, or closed mixing tank reactors.

In yet another embodiment, fibrillated cellulose fibers in a dry form can be used in the fiber treatment 204d. In preparation of dry fibrillated fibers, cellulose pulp is refined using conventional hydrapulpers, pulp refiners or deflakers. The fibrillated fibers are then de-watered and/or dried using techniques such as flash drying and air drying. The wet or dry fibrillated fibers are then brought to contact with desirable dispersants in a reactor. The dispersant treatment of these embodiments can be carried out at room temperature or elevated temperatures under the atmospheric or elevated pressures. The retention time for the treatment may vary to accommodate the process and equipment, preferably 30 seconds to 24 hours. The dosage of the dispersants is preferably in the range of about 0.001% to 20% of oven dried fibers. The reaction temperature can be up to about 250° C., preferably below about 150° C.

As shown in FIG. 2, the treated fibers are subsequently conditioned in step 206. The treated fibers can be conditioned by techniques such as drying, humidifying, and dispersing. After conditioning the fibers, the fibers are further processed. The fibers chemically treated with a dispersant are dispersed or fibrillated. In some cases, fibrillation may not be required. The chemically treated fibers are then incorporated into the manufacture of fiber cement composite materials in step 208.

The dispersants may also be applied directly in the process of making fiber cement composite materials as will be described in greater detail below. Preferably, the dispersants are added to the fibers before mixing with other ingredients. In some embodiments, the cellulose fibers used for preparation of chemically treated fibers with improved dispersibility are individualized cellulose fibers with partial or complete removals of lignin components from the fiber cell walls. In other embodiments, the cellulose fibers used are not individualized cellulose fibers in which the lignin components stay intact.

As an alternative to treating the fibers using the above described methods to impart improved dispersibility, some commercially available treated fluff pulp that are intended for use in the paper industry for applications in diapers, sanitary napkins, hospital pads, and disposable fluff products can also be used as fibers in some embodiments of the present invention. These treated pulps used in the paper industry typically known as treated fluff pulps typically contain debonding agents that weaken the inter-fiber and intra-fiber bonding so that better fiberization of the pulp can be accomplished with lower energy. Although these treated fluff pulp products have been used exclusively in the paper industry for the purpose of reducing fiberization energy, Applicant has found that some of these pulps can be adapted for use in certain preferred embodiments of the present invention to improve fiber dispersibility and reinforcing efficiency in a cementitious matrix. These commercial pulp products include but are not limited to:

Golden Isles EE-100 Grade 4822, 4825, 4839 from Georgia Pacific Co. of Atlanta, Ga.;

NF401, NF405 and CF405 from Weyerhauser Co. of Tacoma, Wash.;

Rayfloc-J-MX-E from Raynoier of Jesup, Fla., and

Georgetown Supersoft Plus from International Paper Co. of Tuxedo, N.Y.

Formulation of Making Fiber Reinforced Cement Materials Using Chemically Treated Fibers with Improved Dispersibility Several of the embodiments described herein can be encompassed by the following formulation:

about 10%-80% by weight cement (hydraulic binder)

about 20%-80% by weight silica (aggregate)

about 0%-50% by weight density modifiers;

about 0%-10% by weight additives; and about 0.5%-20%, more preferably about 4%-12%, by weight chemically treated cellulose fibers with improved dispersibility, or a combination of chemically treated cellulose fibers with improved dispersibility and/or regular fibers, and/or natural inorganic fibers, and/or synthetic fibers.

The cementitious binder is preferably Portland cement but can also be, but is not limited to, high alumina cement, lime, high phosphate cement, and ground granulated blast furnace slag cement, or mixtures thereof. The aggregate is preferably ground silica sand but can also be, but is not limited to, amorphous silica, micro silica, silica fume, diatomaceous earth, coal combustion fly and bottom ashes, rice hull ash, blast furnace slag, granulated slag, steel slag, mineral oxides, mineral hydroxides, clays, magnasite or dolomite, metal oxides and hydroxides and polymeric beads, or mixtures thereof.

The density modifiers can be organic and/or inorganic lightweight materials. The density modifiers may include plastic hollow materials, glass and ceramic materials, calcium silicate hydrates, microspheres, and volcano ashes including perlite, pumice, shirasu balloons and zeolites in expanded forms. The density modifiers can be natural or synthetic materials. The additives can include, but are not limited to, viscosity modifiers, fire retardants, waterproofing agents, silica fume, geothermal silica, thickeners, pigments, colorants, plasticizers, forming agents, flocculents, drainage aids, wet and dry strength aids, silicone materials, aluminum powder, clay, kaolin, alumina trihydrate, mica, metakaolin, calcium carbonate, wollastonite, and polymeric resin emulsion, or mixtures of thereof.

Chemically treated cellulose fibers with improved dispersibility can be used in a variety of composite materials all having different proportions of cementitious binders, aggregates, fibers (chemically treated and/or conventional), and additives to obtain optimum properties for a particular application. In one embodiment, the composite formulation contains about 0.5% to 20% chemically treated fibers with improved dispersibility by weight. Furthermore, the chemically treated fibers with improved dispersibility may be blended with conventional non-chemically treated fibers and/ or synthetic polymer fibers in different proportions. It will be appreciated that the percentage of chemically treated fibers with improved dispersibility may be varied depending on the desired application and/or process. Furthermore, the proportion of the cementitious binder, aggregate, density modifiers, and additives can also be varied to obtain optimal properties for different applications, such as roofing, deck, fences, paving, pipes, siding, trim, soffits, backer for tile underlayment.

In preferred embodiments of the present invention, when the building material is to be autoclaved, a lower amount of cement in the formulation is used incorporating chemically treated, more readily dispersible cellulose fibers. The formulation for the autoclaved fiber cement composite materials in one embodiment comprises:

- about 20-50% by weight cement, more preferably about 35%
- about 30-70% by weight fine ground silica, more preferably about 60%
- about 0-50% by weight density modifiers;
- about 0-10% by weight additives, more preferably about 5%; and
- about 0.5-20% by weight fibers, more preferably about 4-12% fibers, wherein some percentage, up to 100%, of the fibers is cellulose fibers treated with dispersants to increase the hydrophobicity and hence dispersion of the fibers.

Alternatively, for an air-cured product, a higher percentage of cement can be used, more preferably about 60-90%. In an air-cured embodiment, the fine ground silica is not used, although silica may be used as a filler.

Preferably, for the wet processes, the chemically treated fibers with improved dispersibility have a freeness of about 100-700 degrees of Canadian Standard Freeness (CSF) with moisture contents of 0% to 99% based on oven dry weight measured in accordance with TAPPI method T227 om-99. For dry or semi-dry processes, fiberized fibers are preferred. The cementitious binder and aggregate have surface areas of about 150 to 400 $m^2/kg$ and about 300 to 450 $m^2/kg$, respectively. The surface area for both cement and aggregates is tested in accordance with ASTM C204-96a.

Method of Making Fiber Cement Building Materials Using Chemically Treated Fibers with Improved Dispersibility A method of manufacturing a fiber reinforced composite building material using the formulations described constitutes another embodiment of the present invention. A preferred process of manufacturing a fiber reinforced cementitious composite material incorporating chemically treated cellulose fibers with improved dispersibility begins with treating the cellulose fibers with one or more dispersants in which the fiber surface is made substantially hydrophobic. Preferably, the hydroxyl functional groups on the fiber surface are inhibited from forming hydrogen bonds with other hydroxyl groups, thus substantially reducing the occurrence of inter-fiber bonding. In one embodiment, the method further comprises mechanically dispersing the untreated fibers at a pre-selected consistency to separate the fibers so as to facilitate chemical treatment of the fiber surface, and fibrillating the untreated fibers to a pre-selected freeness range. After chemically treating the fibers with a dispersant, the preferred method comprises mixing the chemically treated fibers with ingredients to form a fiber cement mixture in accordance with preferred formulations, forming the fiber cement mixture into a fiber cement article of a pre-selected shape and size, and curing the fiber cement article so as to form the fiber reinforced composite building material.

The dispersants may be applied to any of the above steps prior to forming the fiber cement mixture into a fiber cement article and curing the fiber cement article. Preferably, the chemicals are added to the fibers first to allow enough time for the chemical reactions to take place before mixing the fibers with other ingredients to form the fiber cement mixture. In some embodiments, however, dispersants may be added to the fiber cement mixture while the fibers are being mixed together with other ingredients. Advantageously, fibers treated with dispersants remain substantially dispersed in a cement mixture even after the mechanical mixing action stops, thereby substantially reducing the occurrence of re-clustering or clumping of the fibers in the cement mixture. As will be described in greater detail below, the chemically treated fibers with improved dispersibility provide the final composite material with a more uniform fiber distribution and inhibit the formation of fiber clumps or clusters that are known to reduce the fiber reinforcing efficiency of the product.

Preferably, the step of mixing the chemically treated fibers with improved dispersibility with other ingredients to form a fiber cement mixture comprises mixing the chemically treated fibers with non-cellulose materials such as hydraulic binder, aggregate, density modifiers, and additives in accordance with the preferred formulations of this invention. In some embodiments, the chemically treated fibers can also be mixed with synthetic fibers along with other ingredients. The fabrication processes can use any of the existing technologies, such as extrusion, molding, injection molding, casting, and Hatschek process, etc.

Figure 3:
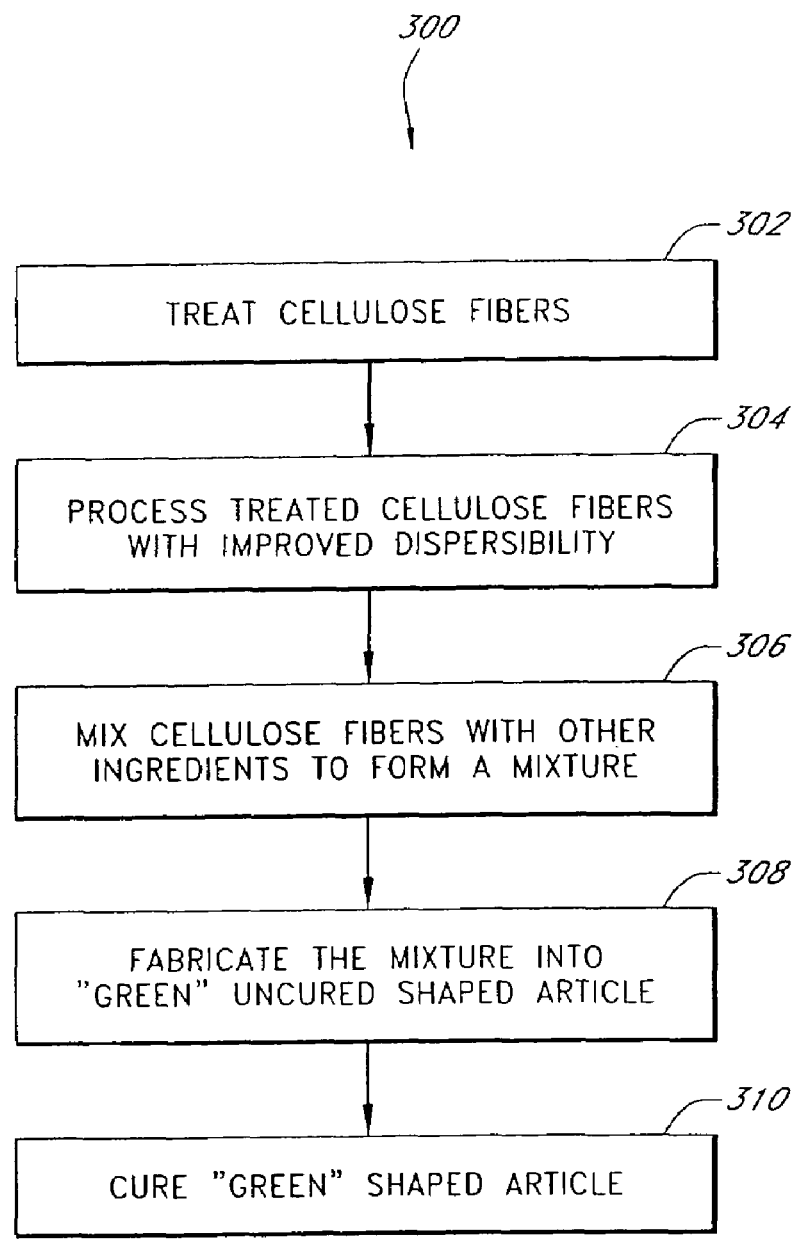
FIG. 3 illustrates an exemplifying process flow of one embodiment of making fiber reinforced cement composite materials incorporating chemically treated fibers with improved dispersibility.

FIG. 3 illustrates a preferred process 300 of manufacturing a fiber reinforced cementitious composite material incorporating the chemically treated cellulose fibers with improved dispersibility. As FIG. 3 shows, the process begins with step 302 in which the cellulose fibers are treated with dispersants to impart the fibers with hydrophobicity. A pre-prepared chemically treated fiber with improved dispersibility may also be used.

The chemically treated fibers with improved dispersibility are subsequently processed in step 304. The fiber processing step 304 typically involves fiber dispersion and fibrillations. In one embodiment, the fibers are dispersed at a consistency of about 1% to 6% in a hydra-pulper, which also imparts some fibrillation. Further fibrillation can be achieved using a refiner or series of refiners. Once dispersed, the fibers are then fibrillated to a range of about 0 to 800 degrees of CSF (Canadian Standard Freeness), more preferably between about 100 to 700 degrees of CSF. Dispersion and fibrillation can also be achieved by other techniques such as hammermilling, deflakering, shredding, and the like. Furthermore, use of fibers chemically treated with a dispersant without fibrillation is also acceptable for some products and processes.

As FIG. 3 shows, in step 306, the chemically treated cellulose fibers with improved dispersibility are proportionally mixed with other ingredients to form a waterborne mixture, slurry, or paste. Preferably, the fibers are mixed with cement, silica, a density modifier and other additives in a well-known mixing process to form a slurry or paste. The chemically treated fibers with improved dispersibility will more readily disperse and distribute uniformly throughout the mix. Furthermore, the fibers will remain substantially dispersed even after the mechanical mixing action stops, thereby reducing the occurrence of re-clustering or clumping of the fibers. In the mixer, synthetic fiber can also be blended with the chemically treated fibers with improved dispersibility.

The process 300 follows with step 308 in which the mixture may be formed into a "green" or uncured shaped article using a number of conventional manufacturing techniques as would be known to one skilled in the art, such as:

Extrusion;
Hatschek sheet process;
Mazza pipe process;
Magnani process;
Injection molding;
Hand lay-up;
Molding;
Casting;
Filter pressing;
Fourdrinier forming;
Multi-wire forming;
Gap blade forming;
Gap roll/blade forming;
Bel-Roll forming;
Others.

These processes may also include a pressing or embossing operation after the article is formed. More preferably, no pressing is used. The processing steps and parameters used to achieve the final product using a Hatschek process are similar to what is described in Australian Patent No. 515151:

Following step 308, the "green" or uncured shaped article is cured in step 310. The article is preferably pre-cured for up to about 80 hours, most preferably about 24 hours or less. The article is then air-cured for approximately 30 days. More preferably, the pre-cured article is autoclaved at an elevated temperature and pressure in a steam saturated environment at about 60 to 200° C. for about 3 to 30 hours, more preferably about 24 hours or less. The time and temperature chosen for the pre-cure and cure processes are dependent on the formulation, the manufacturing process, the process parameters, and the final form of the product.

Fiber Reinforced Cement Composite Materials Using Chemically Treated Fibers with Improved Dispersibility Applications of chemically treated cellulose fibers with improved dispersibility in fiber reinforced composite materials can improve the mechanical and physical properties of the final building product. Fiber cement products using these chemically treated fibers have improved fiber dispersion, improved fiber reinforcing efficiency, improved toughness and strain. The use of chemically treated fibers with improved dispersibility obviates the need of adding additional fibers to the composite material to compensate for poor fiber distribution. Thus, less fibers are needed to achieve the same if not better physical and mechanical properties in the final product, which can result in significant cost reductions. Other desirable characteristics of fiber cement materials using the chemically treated fibers with improved dispersibility include improved water resistance and smoother surface finishes when extrusion, molding, or casting process is used. Moreover, long fibers that are generally more difficult to disperse than short fibers, and thus sometimes avoided, can also be treated to provide them with improved dispersibility. Chemically treated long fibers with improved dispersibility can be used in the formulation to provide additional benefits afforded by using long cellulose fibers as a reinforcement agent.

The following examples demonstrate some of the desirable characteristics that the chemically treated fibers with improved dispersibility provide in the formulations of the fiber reinforced cement composite materials. It will be appreciated that the fiber cement formulations are selected for comparison purposes only and that a variety of other formulations can be used without departing from the scope of the present invention. It will also be appreciated that in addition to fiber cement products, other cementitious and non-cementitious materials such as polymeric, wood, and other materials may also use chemically treated fibers with improved dispersibility in the formulation to improve the mechanical and physical properties of the material. The scope of the present invention is not limited to cementitious composite building materials nor building materials in general.

EXAMPLE 1

In this example, two types of cellulose fibers were fiberized in dry form by a hammermill. One was the debonder treated pulp of Weyerhaeuser pulp grade NF401, and the other was the control fiber, the same fibers without debonder treatment (Weyerhaeuser pulp grade NF416). Fiber cement composite specimens were fabricated using an extrusion process. The formulation for the samples A and B was the same except different fibers were used. The formulation contained 10% fibers (chemically treated fibers having improved dispersion for formulation A and conventional untreated fiber for formulation B), 10% calcium silicate hydrate, 1.5% methylcellulose, 39.25% Portland cement and 39.25% ground silica. The extruded samples were precured at 150° C. for 12 hours and then cured by autoclaving at 185° C. for 12 hours. The densities of Samples A and B were around 0.9 grams per cubic centimeter. Some key physical and mechanical properties of samples A and B are shown in Table 2.

TABLE 2

Comparison of key physical and mechanical properties of extruded fiber cement materials using chemically treated and readily dispersible fibers (A) and conventional untreated cellulose fibers (B)

| Physical Properties | Samples | |
|---|---|---|
| | A | B (Control) |
| Modulus of Rupture (MOR, MPa) | 6.44 | 5.75 |
| Z-Direction Tensile Strength (MPa) | 2.33 | 1.81 |
| Toughness (KJ/m$^3$) | 2.27 | 0.93 |

Table 2 above provides an illustrative comparison of various mechanical and physical properties of fiber cement products made with formulations that incorporate chemically treated cellulose fibers to provide improved dispersibility and those that use conventional untreated fibers. Modulus of rupture (MOR), Z-direction tensile strength, and toughness were tested in accordance with ASTM (American Standard Test Method) C1185-98a entitled "Standard Test Methods for Sampling and Testing Non-Asbestos Fiber-Cement Flat Sheet, Roofing and Siding Shingles, and Clapboards." It will be appreciated by one skilled in the art that the specific values of particular mechanical properties will differ by varying the oven dry density.

As shown in Table 2, the MOR, Z-direction tensile strength, and toughness are all higher for fiber cement materials made with the chemically treated fibers having improved dispersibility. In particular, toughness and strain are physical properties that are highly influenced by the degree of fiber dispersion. Therefore, the degree of fiber dispersion can be measured indirectly by comparing the strain and toughness values of composites made with and without the chemically treated fibers with improved dispersibility. Fibers that are better dispersed will result in a higher strain and toughness value per unit mass of fiber added in the final product. As shown in Table 2, this embodiment of the invention increases the MOR by approximately 12%, the Z-direction tensile strength by approximately 28%, and toughness by approximately 144%, when compared to the equivalent formulation made without chemically treated fibers with improved dispersibility. An equivalent formulation is herein defined as one in which the preferred chemically treated cellulose fibers with improved dispersibility are displaced by an equivalent percentage of cellulose fibers that are not treated with a dispersant in accordance with the embodiments of the present invention. Table 2 shows that fiber cement materials made with chemically treated fibers have better physical and mechanical properties than fiber cement materials of equivalent formulations but made with conventional untreated fibers.

EXAMPLE 2

Figure 4:
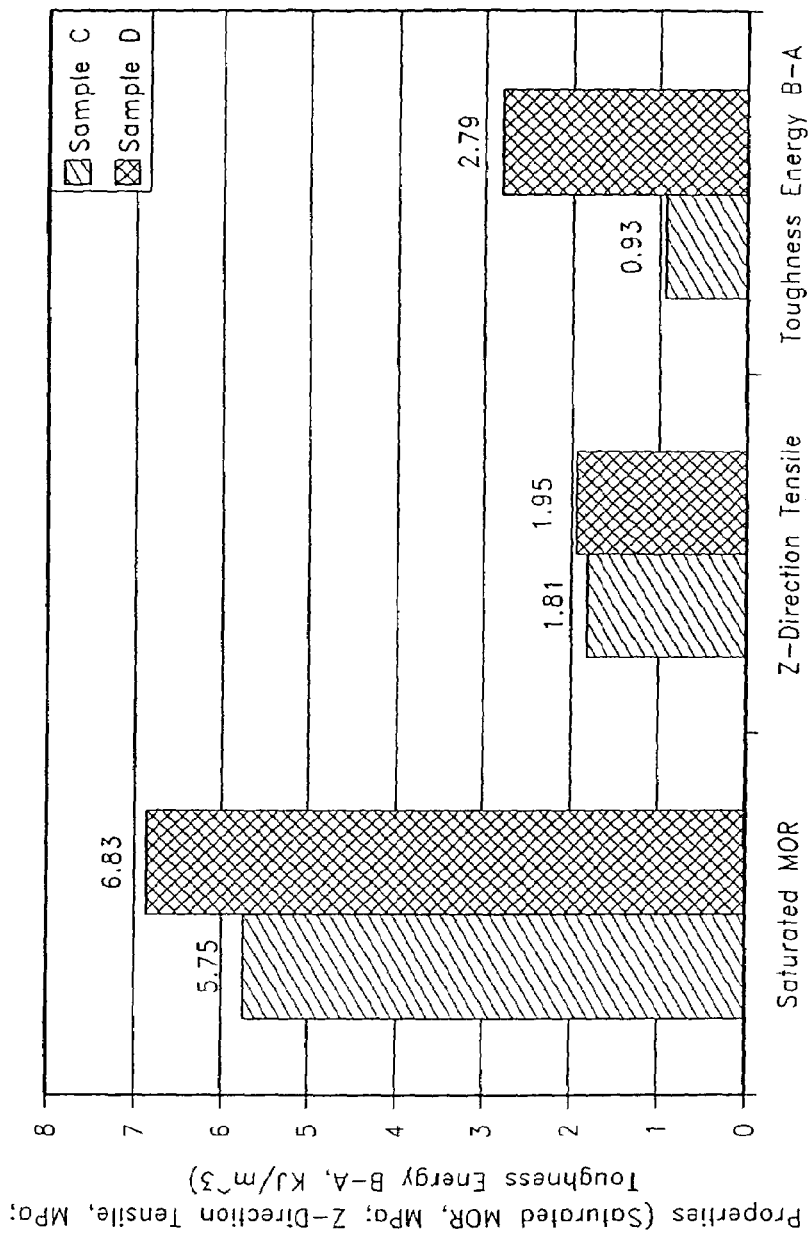
FIG. 4 is a graph illustrating key mechanical and physical properties of fiber cement building materials made with chemically treated fibers with improved dispersibility in accordance with one preferred embodiment and fiber cement materials made with conventional untreated fibers.

FIG. 4 illustrates a comparison of key mechanical and physical properties of extruded fiber reinforced cement composite materials made with and without the chemically treated fibers. Sample D was prepared with chemically treated fibers with improved dispersibility (Weyerhaeuser's grade NF405, a debonder treated fibers) while sample C contains regular pulp (Weyerhaeuser's grade CF416). The samples have the same formulation except for the fibers used: 10% of treated fibers (NF405), 10% of CF416. The fibers were fiberized by hammermilling. The samples were prepared by extrusion and tested for MOR, Z-direction tensile strength and toughness energy in accordance with ASTM (American Standard Test Method) C1185-98a entitled "Standard Test Methods for Sampling and Testing Non-Asbestos Fiber-Cement Flat Sheet, Roofing and Siding Shingles, and Clapboards." As shown in FIG. 4, extruded fiber reinforcement composite materials made with chemically treated fibers with improved dispersibility show about 18% improvement in MOR, about 7% improvement in Z-direction tensile strength and about 200% improvement in toughness when compared to extruded fiber reinforcement composite materials of an equivalent formulation but without the chemically treated fibers.

EXAMPLE 3

In this example, the formulations of samples E and F were substantially the same except that different fibers were used: about 9% fiber by weight (chemically treated fiber with improved dispersibility or regular untreated fiber); about 10% calcium silicate hydrate which, in one embodiment, is used as a density modifier, about 1.5% methylcellulose which, in one embodiment, is used as an additive-viscosity modifier, about 39.75% Portland cement and about 39.75% ground silica. Fibers used in sample E were chemically treated with a surfactant emulsion, about 50:50 blend of di(hydrogenated tallow) dimethyl ammonium chloride (CAS number 61789-80-8) and alkyl-benzyl-dimethy ammonium chloride (CAS number 61789-72-8) by the dry spraying technique. The total dosage of the dispersant was about 0.06% of the oven dried fiber mass. The treatment was done at ambient temperature before the fiberization. Fibers used in Sample F were regular untreated fibers. Specimens of fiber cement composite materials were then formed using extrusion. The extruded samples were procured at about 150° C. for about 12 hours and then cured by autoclaving at about 185° C. for about 12 hours. Some key physical and mechanical properties are shown in Table 3.

TABLE 3

Comparison of key physical and mechanical properties of extruded fiber cement materials using chemically treated fibers with improved dispersibility and regular cellulose fibers

| Physical Properties | Samples | |
| --- | --- | --- |
| | E | F (Control) |
| MOR/Fiber Wt. (MPa/Kg) | 0.68 | 0.61 |
| Strain/Fiber Wt. (μm/m-Kg) | 501 | 465 |
| Toughness/Fiber Wt. (KJ/m$^3$-Kg) | 0.27 | 0.13 |

Table 3 above provides an illustrative comparison of key mechanical and physical properties of fiber cement products that incorporate chemically treated cellulose fibers with improved dispersibility and those that are conventional untreated fibers. The samples were made with equivalent formulations except for the type of fibers used. Average toughness and strain values were determined using a three point bending test in accordance with ASTM (American Standard Test Method) C1185-98a entitled "Standard Test Methods for Sampling and Testing Non-Asbestos Fiber-Cement Flat Sheet, Roofing and Siding Shingles, and Clapboards." This embodiment of the invention increases the MOR per kilogram of fiber used by approximately 11%, the strain per kilogram of fiber used by approximately 7%, and the toughness per kilogram of fiber used by approximately 100%. The strain and toughness values per kilogram of fiber used are indicative of the degree of fiber reinforcing efficiency. Improvements in fiber reinforcing efficiencies are typically reflected in higher strain and toughness values per kilogram of fiber added. Thus, results in Table 3 indicate that the addition of chemically treated fibers improved the fiber reinforcing efficiency of the material as the values of the strain and toughness energy per kilogram of fiber added for materials made with chemically treated fibers are higher than that of materials made with an equivalent formulation without chemically treated fibers.

CONCLUSION

In general, it will be appreciated that preferred embodiments of the present invention, in particular a chemically treated cellulose fiber incorporated into a fiber cement building material, have several advantages over the prior art. These materials, made in accordance with the preferred processes and formulations, have better fiber dispersion and higher fiber reinforcing efficiency, thus require less fiber dosage to attain the required physical and mechanical properties. Furthermore, improved fiber reinforcing efficiency also leads to improved physical and mechanical properties such as higher modulus of rupture, higher Z-direction tensile strength, higher toughness, higher strain, and better interlaminate bonding strength. The chemically treated fibers with improved dispersibility also improve water resistance and surface smoothness of the finished products, and reduce cost in fiber use.

The chemically treated fibers of the preferred embodiments of the present invention have reduced inter-fiber and intra-fiber hydrogen bonding and thus can be more readily dispersed in a mixture. Once dispersed in a mixture, the chemically treated fibers tend to remain dispersed and are substantially less likely to re-cluster and form into clumps when mechanical mixing stops. The chemically treated fibers with improved dispersibility can be readily and uniformly distributed throughout a cementitious matrix thus eliminating the need to add higher fiber dosage to compensate for poor fiber dispersion. In one embodiment, the use of chemically treated fibers with improved dispersibility results in about 5% reduction in dosage of fibers added to the building material while still achieving the same physical and mechanical properties. The chemically treated fibers with improved dispersibility also have better dispersibility in all types of aqueous solutions. Furthermore, treating cellulose fibers with dispersants will allow both long and short fibers to be used in the wet and semi-wet processes of manufacturing fiber cement composite materials.

It will be appreciated that the fiber cement formulations are selected for comparison purposes only and that a variety of other formulations can be used without departing from the scope of the present invention. In addition to fiber cement products, other materials may also use chemically treated fibers with dispersibility in the formulation to improve the mechanical and physical properties of the material. It will also be appreciated that several fiber treatments such as fiber sizing, biocide treatment, and fiber loading can be combined with dispersant treatment to provide the treated fiber and the fiber cement composite material with even more desirable properties.

The preferred embodiments have applicability to a number of building product applications, including but not limited to roofing, paving, exterior and interior panels, decking, piping, tile backers, siding, trim, soffits, and fencing. However, it will be appreciated that the scope of the applicability of the preferred embodiments can also include, but is not limited to, non-building products and/or materials with non-cementitious matrices. The embodiments illustrated and described above are provided as examples of certain preferred embodiments of the present invention. Various changes and modifications can be made from the embodiments presented herein by those skilled in the art without departure from the spirit and scope of this invention.

What is claimed is:

1. A method of manufacturing a building material, comprising:
   providing cellulose fibers;
   treating initially before mixing at least a portion of the cellulose fibers with a dispersant to form chemically treated fibers with improved dispersibility, wherein the dispersant is a cationic quaternaryamine dispersant, wherein the dispersant imparts improved fiber dispersibility in the aqueous phase;
   mixing the chemically treated fibers with a cementitious binder to form a fiber cement mixture;
   forming the fiber cement mixture into a fiber cement article; and
   curing the fiber cement article so as to form a fiber reinforced composite building material.

2. The method of claim 1, wherein treating the fibers comprises treating the cellulose fibers in a solution containing surfactants.

3. The method of claim 1, wherein treating the fibers in solution comprises applying between about 0.001%-20% of dispersants to the fibers by fiber mass.

4. The method of claim 1, wherein treating the fibers comprises chemically bonding a dispersant to the fiber surface in a manner such that the dispersant substantially blocks at least a portion of the hydroxyl groups on the fiber surface.

5. The method of claim 1, wherein treating the fibers comprises using a dry spray process to deposit dispersants on the fiber surface.

6. The method of claim 1, wherein providing the fibers comprises fiberizing the fibers, wherein the fiberization process can be carried out before, during or after the step of treating the fibers.

7. The method of claim 1, wherein providing the fibers comprises fibrillating the fibers to a range of between about 100 to 700 degrees of Canadian Standard Freeness.

8. The method of claim 1, wherein providing the fibers comprises chemically removing the lignins of the fibers so as to individualize the fibers.

9. The method of claim 1, wherein forming the fiber cement mixture into a fiber cement article comprises using a process selected from the group consisting of extrusion, injection molding, molding, and Hatschek.

10. A method of manufacturing a building material, comprising:
    mixing fibers that have been chemically treated with a dispersant initially before mixing with a cementitious binder and other ingredients to form a fiber cement mixture, wherein the dispersant is a cationic quaternaryamine dispersant, wherein the fibers are cellulose fibers;
    forming the fiber cement mixture into a fiber cement article; and
    curing the fiber cement article so as to form a fiber reinforced composite building material.

11. The method of claim 10, wherein mixing fibers that have been chemically treated with a dispersant comprises mixing the treated fluff pulps with a cementitious binder to form a fiber cement mixture.

12. A building material formulation used to form a building material, comprising:
    a hydraulic binder;
    an aggregate;
    cellulose fibers, wherein at least a portion of the fibers are at least partially treated with a dispersant initially before mixing to form chemically treated fibers with improved dispersibility, wherein the dispersant is a cationic quaternaryamine dispersant, wherein the dispersant binds hydroxyl groups on the fiber surface so as to substantially inhibit binding between hydroxyl groups of different fibers, thereby substantially reducing inter-fiber hydrogen bonding so that the chemically treated fibers can be more readily dispersed in a mixture.

13. The formulation of claim 12, wherein the cellulose fibers comprise about 0.5%-20% of the formulation by weight.

14. The formulation of claim 12, wherein about up to 100% of the cellulose fibers by weight are at least partially treated with a dispersant.

15. The formulation of claim 12, wherein the dispersant treated cellulose fibers comprise fluff pulps treated with debonders.

16. The formulation of claim 12, wherein at least a portion of the fibers are at least partially treated with a dispersant selected from the group consisting of polyamine compounds, alkylalkoxylsilane, alkoxylsilane, and halide organosilane, and combinations thereof.

17. The formulation of claim 12, wherein the hydraulic binder comprises about 20%-50% cement by weight.

18. The formulation of claim 12, wherein the aggregate comprises about 20%-80% silica by weight.

19. The formulation of claim 12 further comprising 0%-50% additives.

20. The formulation of claim 19, wherein the additives comprises low density additives.

21. The formulation of claim 12, wherein the cellulose fibers comprise individualized cellulose fibers.

* * * * *